United States Patent
Chun et al.

(10) Patent No.: US 7,899,026 B2
(45) Date of Patent: Mar. 1, 2011

(54) METHOD OF PERFORMING CHANNEL QUALITY REPORT IN A WIRELESS COMMUNICATION SYSTEM

(75) Inventors: Sung Duck Chun, Anyang-si (KR); Young Dae Lee, Anyang-si (KR); Sung Jun Park, Anyang-si (KR); Seung June Yi, Anyang-si (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 12/452,433

(22) PCT Filed: Aug. 11, 2008

(86) PCT No.: PCT/KR2008/004661
§ 371 (c)(1),
(2), (4) Date: Apr. 23, 2010

(87) PCT Pub. No.: WO2009/022835
PCT Pub. Date: Feb. 19, 2009

(65) Prior Publication Data
US 2010/0208597 A1    Aug. 19, 2010

Related U.S. Application Data

(60) Provisional application No. 60/955,040, filed on Aug. 10, 2007, provisional application No. 60/955,651, filed on Aug. 14, 2007.

(30) Foreign Application Priority Data

Aug. 8, 2008    (KR) .......................... 10-2008-0078194

(51) Int. Cl.
*H04J 3/24*    (2006.01)
(52) U.S. Cl. ........................................ 370/349; 370/332
(58) Field of Classification Search .................. 370/328, 370/349, 310.2, 314, 329, 332, 333, 338, 370/341
See application file for complete search history.

(56) References Cited

U.S. PATENT DOCUMENTS

| 5,878,041 A | 3/1999 | Yamanaka et al. |
| 6,594,240 B1 | 7/2003 | Chuah et al. |
| 6,728,918 B1 | 4/2004 | Ikeda et al. |

(Continued)

FOREIGN PATENT DOCUMENTS

EP    1 343 267    9/2003

(Continued)

OTHER PUBLICATIONS

Ghosh et al., "Random Access Design for UMTS Air-Interface Evolution", Vehicular Technology Conference, Apr. 2007, pp. 1041-1045.

(Continued)

*Primary Examiner* — Brenda Pham
(74) *Attorney, Agent, or Firm* — McKenna Long & Aldridge LLP

(57) ABSTRACT

A method of reporting of channel quality in a wireless communication system is disclosed. A method of reporting of channel quality in a user equipment, which receives a point-to-multipoint service in a wireless communication system, comprises receiving configuration information for reporting of channel quality from a network, the configuration information corresponding to each of at least one uplink channel, receiving a request message requesting the channel quality from the network, and reporting the channel quality using configuration information corresponding to an uplink channel among the at least one uplink channel.

7 Claims, 8 Drawing Sheets

U.S. PATENT DOCUMENTS

| | | | |
|---|---|---|---|
| 6,738,624 B1 | 5/2004 | Aksentijevic et al. | |
| 6,874,113 B2 | 3/2005 | Chao et al. | |
| 6,967,936 B1 | 11/2005 | Laroia et al. | |
| 7,171,163 B2* | 1/2007 | Terry et al. | 455/67.11 |
| 7,180,885 B2 | 2/2007 | Terry et al. | |
| 7,227,857 B2 | 6/2007 | Lee | |
| 7,227,868 B2 | 6/2007 | Inden | |
| 7,295,573 B2 | 11/2007 | Yi et al. | |
| 7,313,116 B2* | 12/2007 | Lee et al. | 370/335 |
| 7,817,595 B2* | 10/2010 | Wu | 370/328 |
| 2002/0001314 A1 | 1/2002 | Yi et al. | |
| 2002/0009999 A1 | 1/2002 | Lee et al. | |
| 2002/0122411 A1 | 9/2002 | Zimmerman et al. | |
| 2003/0007490 A1 | 1/2003 | Yi et al. | |
| 2003/0194992 A1 | 10/2003 | Kim et al. | |
| 2004/0022213 A1 | 2/2004 | Choi et al. | |
| 2004/0103435 A1 | 5/2004 | Yi et al. | |
| 2004/0146019 A1 | 7/2004 | Kim et al. | |
| 2004/0147236 A1 | 7/2004 | Parvall et al. | |
| 2004/0156330 A1 | 8/2004 | Yi et al. | |
| 2005/0020260 A1 | 1/2005 | Jeong et al. | |
| 2005/0047416 A1 | 3/2005 | Heo et al. | |
| 2005/0054365 A1 | 3/2005 | Ahn et al. | |
| 2005/0063347 A1 | 3/2005 | Sarkkinen et al. | |
| 2005/0094596 A1 | 5/2005 | Pietraski et al. | |
| 2005/0096017 A1 | 5/2005 | Kim et al. | |
| 2005/0118992 A1 | 6/2005 | Jeong et al. | |
| 2005/0250526 A1 | 11/2005 | Lindoff et al. | |
| 2005/0254467 A1 | 11/2005 | Li et al. | |
| 2005/0259662 A1 | 11/2005 | Kim et al. | |
| 2005/0287957 A1 | 12/2005 | Lee et al. | |
| 2006/0067238 A1 | 3/2006 | Olsson | |
| 2006/0067289 A1 | 3/2006 | Lee et al. | |
| 2006/0072494 A1 | 4/2006 | Matusz | |
| 2006/0072503 A1 | 4/2006 | Kim et al. | |
| 2006/0084389 A1 | 4/2006 | Beale et al. | |
| 2006/0154680 A1 | 7/2006 | Kroth et al. | |
| 2006/0165045 A1 | 7/2006 | Kim et al. | |
| 2006/0203780 A1 | 9/2006 | Terry | |
| 2006/0233200 A1 | 10/2006 | Fifield et al. | |
| 2006/0251027 A1 | 11/2006 | Chun et al. | |
| 2006/0251105 A1 | 11/2006 | Kim et al. | |
| 2006/0268798 A1 | 11/2006 | Kim et al. | |
| 2006/0280145 A1 | 12/2006 | Revel et al. | |
| 2007/0047493 A1 | 3/2007 | Park et al. | |
| 2007/0060139 A1 | 3/2007 | Kim et al. | |
| 2007/0079207 A1 | 4/2007 | Seidel et al. | |
| 2007/0081468 A1 | 4/2007 | Timus et al. | |
| 2007/0081513 A1 | 4/2007 | Torsner | |
| 2007/0091810 A1 | 4/2007 | Kim et al. | |
| 2007/0201397 A1 | 8/2007 | Zhang | |
| 2007/0268861 A1 | 11/2007 | Diachina et al. | |
| 2007/0274278 A1 | 11/2007 | Choi et al. | |
| 2008/0051098 A1 | 2/2008 | Rao | |
| 2008/0182609 A1 | 7/2008 | Somasundaram et al. | |
| 2008/0186936 A1 | 8/2008 | Chun et al. | |
| 2008/0186944 A1 | 8/2008 | Suzuki et al. | |
| 2008/0310395 A1 | 12/2008 | Kashima | |
| 2009/0104890 A1 | 4/2009 | Wang et al. | |
| 2009/0175163 A1 | 7/2009 | Sammour et al. | |
| 2009/0175253 A1 | 7/2009 | Wu et al. | |

FOREIGN PATENT DOCUMENTS

| | | |
|---|---|---|
| EP | 1 508 992 | 2/2005 |
| EP | 1 689 130 | 8/2006 |
| EP | 1 746 855 | 1/2007 |
| EP | 1 768 297 | 3/2007 |
| EP | 1 796 405 | 6/2007 |
| KR | 10-2001-0045783 | 6/2001 |
| KR | 10-2001-0062306 | 7/2001 |
| KR | 10-2002-0004645 | 1/2002 |
| KR | 10-2003-0012048 | 2/2002 |
| KR | 10-2002-0097304 | 12/2002 |
| KR | 10-2003-0060055 | 7/2003 |
| KR | 10-2003-0068743 | 8/2003 |
| KR | 10-2003-0087914 A | 11/2003 |
| KR | 10-2004-0034398 | 4/2004 |
| KR | 10-2004-0039944 | 5/2004 |
| KR | 10-2004-0072961 | 8/2004 |
| KR | 10-2005-0022988 | 3/2005 |
| KR | 10-2005-0062359 | 6/2005 |
| KR | 10-2005-0081836 | 8/2005 |
| KR | 10-2005-0092874 | 9/2005 |
| KR | 10-2005-0099472 | 10/2005 |
| KR | 10-2005-0100882 | 10/2005 |
| KR | 10-2005-0103127 A | 10/2005 |
| KR | 10-2006-0004935 | 1/2006 |
| KR | 10-2006-0014910 | 2/2006 |
| KR | 10-2006-0029452 | 4/2006 |
| KR | 10-2006-0042858 | 5/2006 |
| KR | 10-2006-0069378 | 6/2006 |
| KR | 10-2006-0079784 | 7/2006 |
| KR | 10-2006-0090191 | 8/2006 |
| KR | 10-2006-0134058 | 12/2006 |
| KR | 10-2007-0048552 | 5/2007 |
| KR | 10-2007-0076374 | 7/2007 |
| WO | WO 03/045103 | 5/2003 |
| WO | WO 2004/042963 | 5/2004 |
| WO | WO 2005/039108 | 4/2005 |
| WO | WO 2005/125226 | 12/2005 |
| WO | WO 2006/046894 | 5/2006 |
| WO | WO 2006/052086 | 5/2006 |
| WO | WO 2006/118418 | 11/2006 |
| WO | WO 2007/024065 | 3/2007 |
| WO | WO 2007/039023 | 4/2007 |
| WO | WO 2007/052900 | 5/2007 |
| WO | WO 2007/066900 | 6/2007 |
| WO | WO 2007/078142 | 7/2007 |
| WO | WO 2007/078164 | 7/2007 |
| WO | WO 2007/078173 | 7/2007 |
| WO | WO 2007/078174 A1 | 7/2007 |
| WO | WO 2007/089797 | 8/2007 |
| WO | WO 2007/126793 | 11/2007 |
| WO | WO 2007-078174 A1 | 12/2007 |
| WO | WO 2007/147431 | 12/2007 |

OTHER PUBLICATIONS

Abeta et al., "Super 3G Technology Trends. Part 2: Research on Super 3G Technology", NTT Docomo Technical Journal, vol. 8, No. 3, Dec. 2006, pp. 55-62.

Nokia, "System Information Distrubution", 3GPP TSG-RAN WG2 Ad Hoc Meeting on LTE, R2-061487, Jun. 2006.

LG Electronics, "Delivery of LTE System Information", 3GPP TSG-RAN WG2 Ad Hoc Meeting on LTE, R2-061959, Jun. 2006.

NEC, "Optimised buffer status reporting", 3GPP TSG-RAN WG2 #58bis, R2-072515, Jun. 2007.

Catt, Ritt, "Consideration on UL Buffer Reporting", 3GPP TSG-RAN WG2 #55, R2-062935, Oct. 2006.

Wang et al., U.S. Appl. No. 60/976,139.

Sammour et al., U.S. Appl. No. 61/019,058.

ZTE: "Redundant retransmission restraint in RLC-AM" 3GPP Draft R2-061234, May 3, 2006, XP050131180.

"Digital Cellular telecommunications system (Phase 2+); Functional stage 2 description of Location Services (LSC) in Geran (3GPP TS 43.059 version 7.3.0 Release 7); ETSI TS 143 059", May 1, 2007, XP014038519.

LG Electronics Inc: "UE State Transition in LTE_Active", 3 GPP TSG-RAN WG2 #52; Athens, Greece; Mar. 2006.

Texas Instruments: "UL Synchronization Management and Maintenance in E-Utra"; Kobe, Japan; May 2007.

Texas Instruments: "UL Synchronization Management in LTE_Active"; St. Julians, Malta; Mar. 2007.

Motorola: "Contention-Free Intra-LTE Handover"; St. Louis, USA; Feb. 2007.

Ericsson: "Scheduling Request in E-Utran", Sorrento, Italy; Jan. 2007.

* cited by examiner

METHOD OF PERFORMING CHANNEL QUALITY REPORT IN A WIRELESS COMMUNICATION SYSTEM

This application claims priority to International Application No. PCT/KR2008/004661, filed on Aug. 11, 2008 which claims priority to U.S. Provisional Application No. 60/955,040 filed Aug. 10, 2007, U.S. Provisional Application No. 60/955,651, filed on Aug. 14, 2007 and Korean Patent Application No. 10-2008-0078194, filed Aug. 8, 2008, all of which are incorporated by reference for all purposes as if fully set forth herein.

TECHNICAL FIELD

The present invention relates to a wireless communication system, and more particularly, to a method of reporting of channel quality in a wireless communication system.

BACKGROUND ART

In order to perform smooth communication in a wireless communication, channel quality measurement and reporting procedures are performed. In case of the channel quality measurement procedure, a base station notifies a user equipment of a type of a measurement procedure, a measurement target, a measurement value, criteria of a measurement report, and a target of the measurement report. And, the user equipment measures channel quality using the above information and reports the measured result to the base station. The measurement target could be a downlink channel where reference signals are transmitted from the base station to the user equipment. The measurement value could be a carrier to interference and noise ratio (CINR), Ec/No, and received signal code power (RSCP), for example. During measurement report, the user equipment can transmit channel quality information (CQI) to the base station, wherein the channel quality information is a value obtained by quantizing the measurement value. The base station can performs downlink and/or uplink scheduling using the measurement report.

A point-to-multipoint service means a service provided using a point-to-multipoint bearer service. For example, a multimedia broadcast multicast service (MBMS) provided in a 3GPP (3rd Generation Partnership Project) system means a streaming or background service provided to a plurality of user equipments using MBMS bearer service dedicated for a downlink. The MBMS can be provided using a point-to-point radio bearer in addition to the point-to-multipoint radio bearer.

According to the related art, since the user equipment which receives the MBMS has used its dedicated uplink channel to perform measurement report, the user equipment has continued to occupy the dedicated uplink channel even for a time interval where the user equipment does not perform measurement report.

DISCLOSURE OF THE INVENTION

As described above, in case of the point-to-multipoint service such as MBMS, since the service is provided to a plurality of user equipments, if each user equipment which receives the point-to-multipoint service continues to occupy its dedicated uplink channel to perform measurement report, uplink resources for measurement report continue to increase as the number of user equipments increases. For this reason, a problem occurs in that uplink radio resources are not used efficiently.

Accordingly, the present invention is directed to a method of performing channel quality reporting in a wireless communication system, which substantially obviates one or more problems due to limitations and disadvantages of the related art.

An object of the present invention is to provide a method of performing channel quality reporting in a wireless communication system, in which a measurement procedure can be performed while uplink radio resources are being efficiently used in a wireless communication system which provides a point-to-multipoint service.

To achieve these objects and other advantages and in accordance with the purpose of the invention, as embodied and broadly described herein, in one aspect of the present invention, a method of reporting channel quality in a user equipment receiving a point-to-multipoint service in a wireless communication system, comprises receiving configuration information for channel quality reporting from a network, the configuration information corresponding to each of at least one uplink channel, receiving a request message requesting to report channel quality from the network, and reporting channel quality using configuration information corresponding to an uplink channel among the at least one uplink channel.

In another aspect of the present invention, a method of reporting channel quality through a random access procedure in a specific user equipment, which receives a point-to-multipoint service in a wireless communication system, comprises receiving a request message requesting to report channel quality from the network, transmitting a preamble for random access to the network, receiving a response message from the network in response to the preamble, the response message including uplink radio resource allocation information, and reporting channel quality to the network using the uplink radio resource allocation information.

According to the present invention, if a measurement procedure of a user equipment which receives a point-to-multipoint service in a wireless communication system is performed, radio resources can be used efficiently.

BRIEF DESCRIPTION OF THE DRAWINGS

FIG. 3A and FIG. 3B are diagrams illustrating a structure of a radio interface protocol between a user equipment (UE) and E-UTRAN, in which FIG. 3A is a schematic view of a control plane protocol and FIG. 3B is a schematic view of a user plane protocol;

BEST MODE FOR CARRYING OUT THE INVENTION

Hereinafter, structures, operations, and other features of the present invention will be understood readily by the preferred embodiments of the present invention, examples of which are illustrated in the accompanying drawings. Embodiments described later are examples in which technical features of the present invention are applied to E-UMTS (Evolved Universal Mobile Telecommunications System).

Figure 1:
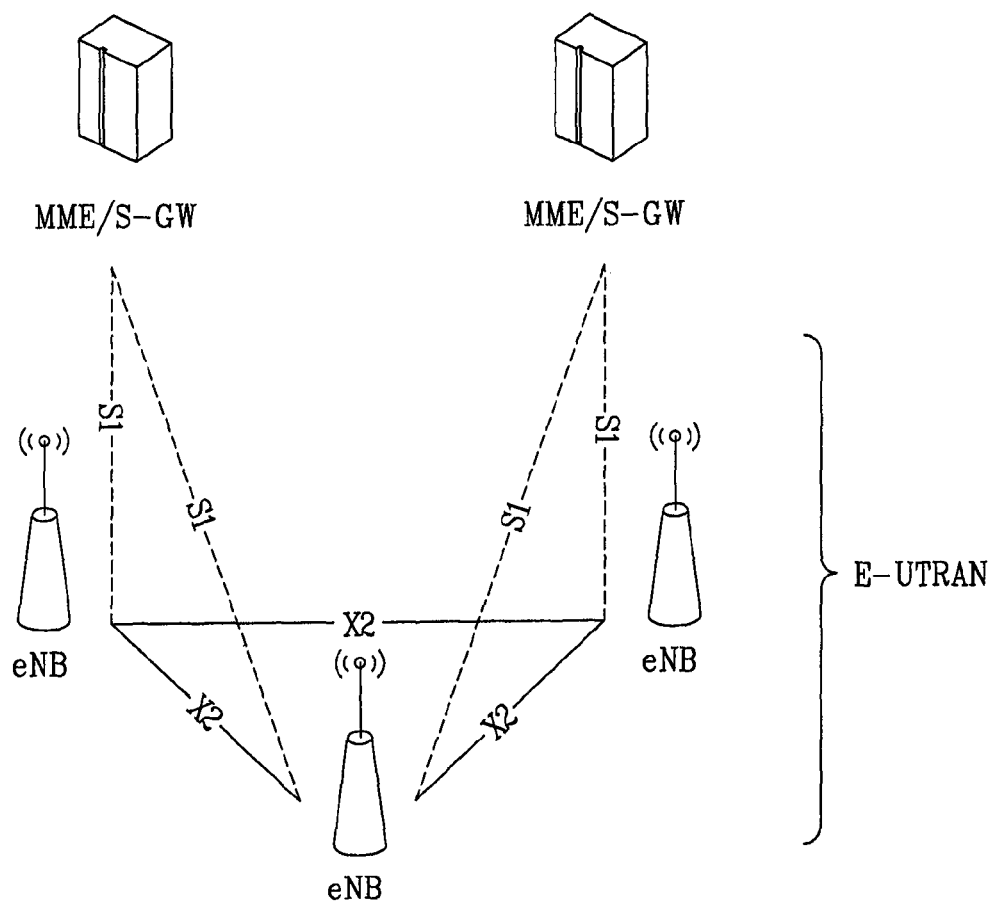
FIG. 1 is a diagram illustrating a network structure of an E-UMTS (Evolved-Universal Mobile Telecommunications System)

FIG. 1 illustrates a network structure of an E-UMTS. An E-UMTS is a system evolving from the conventional WCDMA UMTS and its basic standardization is currently handled by the 3GPP (3$^{rd}$ Generation Partnership Project). The E-UMTS can also be called an LTE (Long Term Evolution) system.

Referring to FIG. 1, an E-UTRAN includes base stations (hereinafter, referred to as 'eNode B' or eNB'), wherein respective eNBs are connected with each other through X2 interface. Also, each of eNBs is connected with a user equipment (UE) through a radio interface and connected with EPC (Evolved Packet Core) through S1 interface. The EPC includes a mobility management entity/system architecture evolution (MME/SAE) gateway.

Layers of a radio interface protocol between a user equipment (UE) and a network can be classified into a first layer L1, a second layer L2 and a third layer L3 based on three lower layers of OSI (open system interconnection) standard model widely known in communication systems. A physical layer belonging to the first layer L1 provides an information transfer service using a physical channel. A radio resource control (hereinafter, abbreviated as 'RRC') located at the third layer plays a role in controlling radio resources between the UE and the network. For this, the RRC layer enables RRC messages to be exchanged between the UE and the network. The RRC layer can be distributively located at network nodes including Node B, an AG and the like or can be independently located at either the Node B or the AG.

Figure 2:
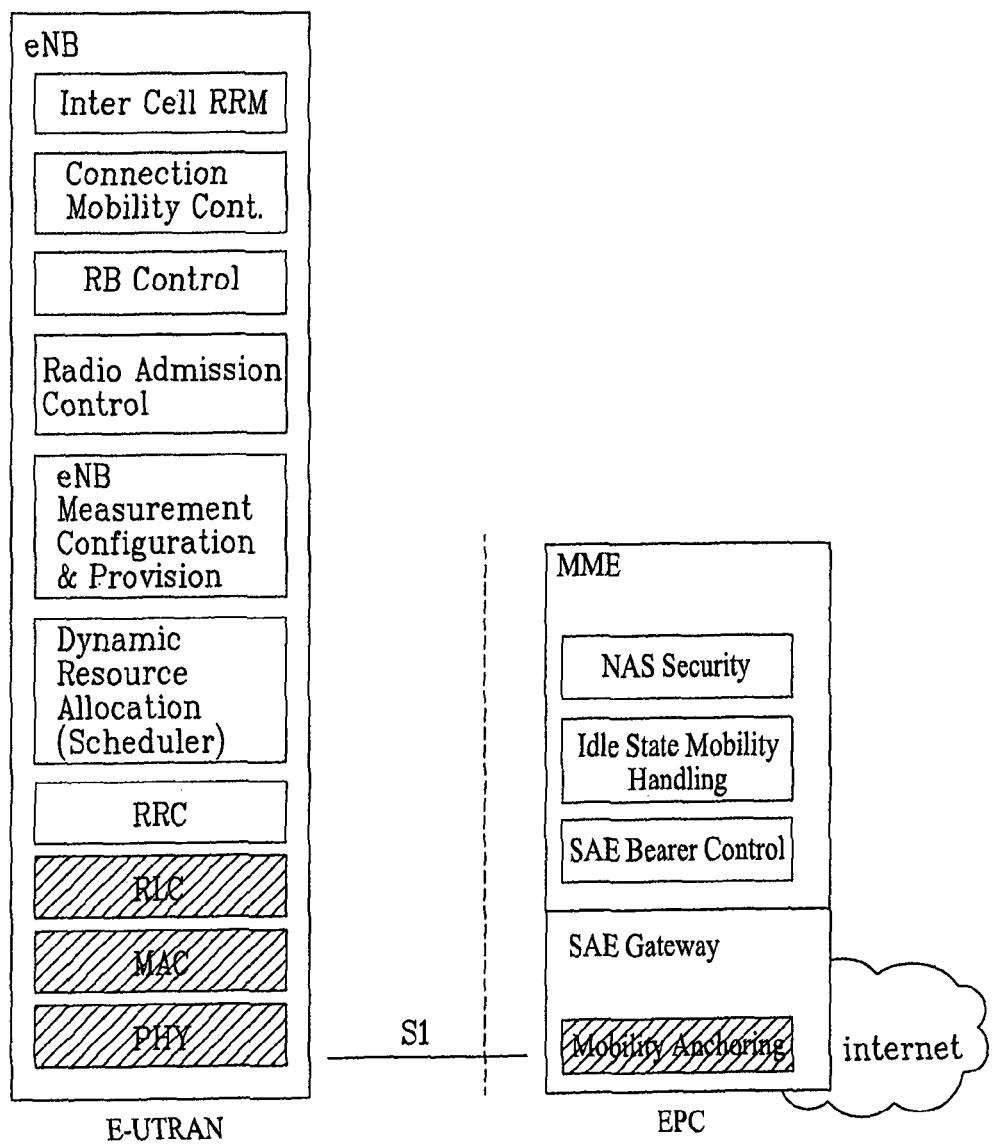
FIG. 2 is a schematic view illustrating an E-UTRAN (Evolved Universal Terrestrial Radio Access Network)

FIG. 2 is a schematic view illustrating an E-UTRAN (UMTS terrestrial radio access network). In FIG. 2, a hatching part represents functional entities of a user plane and a non-hatching part represents functional entities of a control plane.

Figure 3A:
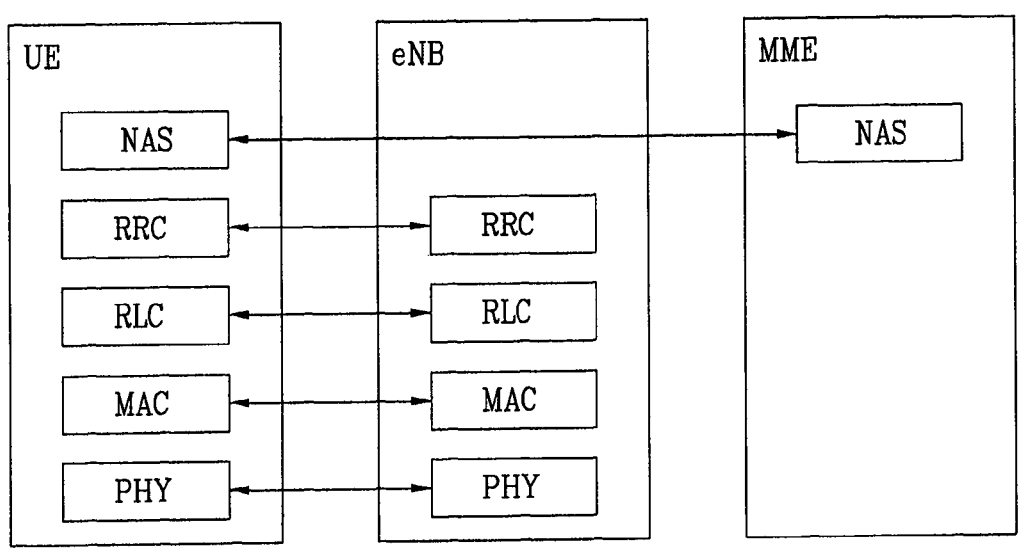
Figure 3B:
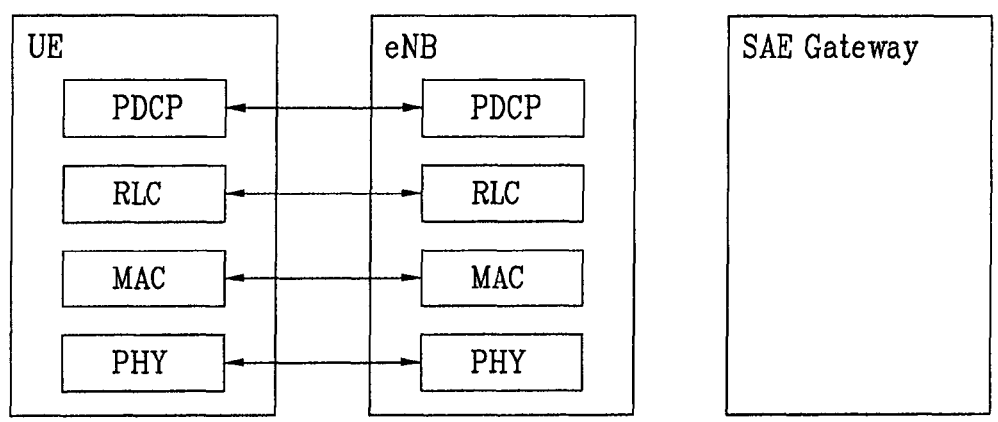

FIG. 3A and FIG. 3B illustrate a structure of a radio interface protocol between the user equipment (UE) and the E-UTRAN, in which FIG. 3A is a schematic view of a control plane protocol and FIG. 3B is a schematic view of a user plane protocol. Referring to FIG. 3A and FIG. 3B, a radio interface protocol horizontally includes a physical layer, a data link layer, and a network layer, and vertically includes a user plane for data information transfer and a control plane for signaling transfer. The protocol layers in FIG. 3A and FIG. 3B can be classified into L1 (first layer), L2 (second layer), and L3 (third layer) based on three lower layers of the open system interconnection (OSI) standard model widely known in the communications systems.

The physical layer as the first layer provides an information transfer service to an upper layer using physical channels. The physical layer (PHY) is connected to a medium access control (hereinafter, abbreviated as 'MAC') layer above the physical layer via transport channels. Data is transferred between the medium access control layer and the physical layer via the transport channels. Moreover, data is transferred between different physical layers, and more particularly, between one physical layer of a transmitting side and the other physical layer of a receiving side via the physical channels. The physical channel of the E-UMTS is modulated in accordance with an orthogonal frequency division multiplexing (OFDM) scheme, and time and frequency are used as radio resources.

The medium access control (hereinafter, abbreviated as 'MAC') layer of the second layer provides a service to a radio link control (hereinafter, abbreviated as 'RLC') layer above the MAC layer via logical channels. The RLC layer of the second layer supports data transfer with reliability. In order to effectively transmit IP packets (e.g., IPv4 or IPv6) within a radio-communication period having a relatively narrow bandwidth, a PDCP layer of the second layer (L2) performs header compression to reduce unnecessary control information.

A radio resource control (hereinafter, abbreviated as 'RRC') layer located on a lowest part of the third layer is defined in the control plane only and is associated with configuration, reconfiguration and release of radio bearers (hereinafter, abbreviated as 'RBs') to be in charge of controlling the logical, transport and physical channels. In this case, the RB means a service provided by the second layer for the data transfer between the UE and the UTRAN.

As downlink transport channels carrying data from the network to UEs, there are provided a broadcast channel (BCH) carrying system information, a paging channel (PCH) carrying paging message, and a downlink shared channel (SCH) carrying user traffic or control messages. The traffic or control messages of a downlink multicast or broadcast service can be transmitted via the downlink SCH or an additional downlink multicast channel (MCH). Meanwhile, as uplink transport channels carrying data from UEs to the network, there are provided a random access channel (RACH) carrying an initial control message and an uplink shared channel (UL-SCH) carrying user traffic or control message.

As logical channels located above the transport channels and mapped with the transport channels, there are provided a broadcast control channel (BCCH), a paging control channel (PCCH), a common control channel (CCCH), a multicast control channel (MCCH), and a multicast traffic channel (MTCH).

In the E-UMTS, an orthogonal frequency division multiple (OFDM) technique is used on the downlink and a single carrier frequency division multiple access (SC-FDMA) technique on the uplink. The OFDM mode using multiple carriers allocates resources by unit of multiple sub-carriers including a group of carriers and utilizes an orthogonal frequency division multiple access (OFDMA) as an access scheme.

In a wireless communication system which uses multiple carrier technique, such as OFDM or OFDMA, radio resources are a set of continuous sub-carriers, and are defined by a time-frequency region on a two-dimensional sphere. One time-frequency region in the OFDM or OFDMA is identified by a rectangular form sectioned by time and sub-carrier coordinates. In other words, one time-frequency region could be identified by a rectangular form sectioned by at least one symbol on a time axis and a plurality of sub-carriers on a frequency axis. Such a time-frequency region can be allocated to an uplink for a specific UE, or a base station can transmit the time-frequency region to a specific user equipment (UE) in a downlink. In order to define such a time-frequency region on the two-dimensional sphere, the number of OFDM symbols in the time region and the number of continuous sub-carriers in the frequency region should be given, wherein the continuous sub-carriers start from a point having an offset from a reference point.

The E-UMTS which is currently being discussed uses 10 ms radio frame comprising 10 sub-frames. Also, one sub-frame includes two continuous slots. One slot has a length of 0.5 ms. One sub-frame comprises a plurality of OFDM symbols and a part (for example, first symbol) of the plurality of OFDM symbols can be used for transmission of L1/L2 control information.

Figure 4:
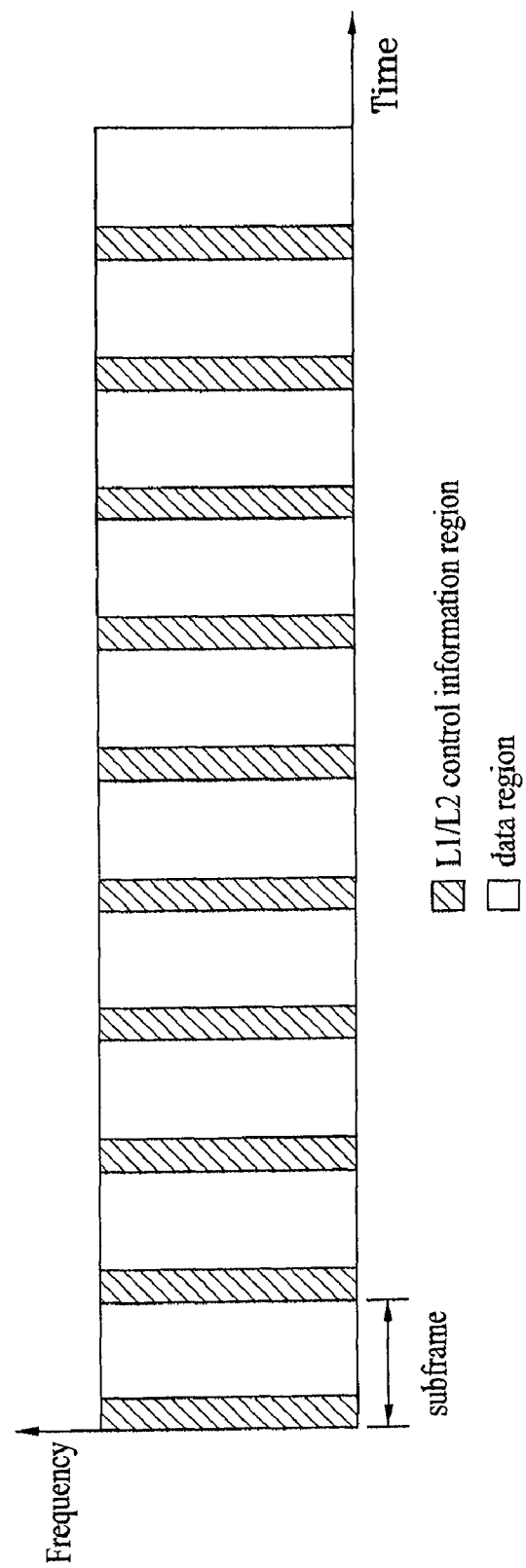
FIG. 4 is a diagram illustrating an example of a physical channel used in an E-UMTS.

FIG. 4 is a diagram illustrating a structure of a physical channel used in the E-UMTS. In FIG. 4, one sub-frame comprises an L1/L2 control information transmission region (the hatching part) and a data transmission region (the non-hatching part).

Figure 5:
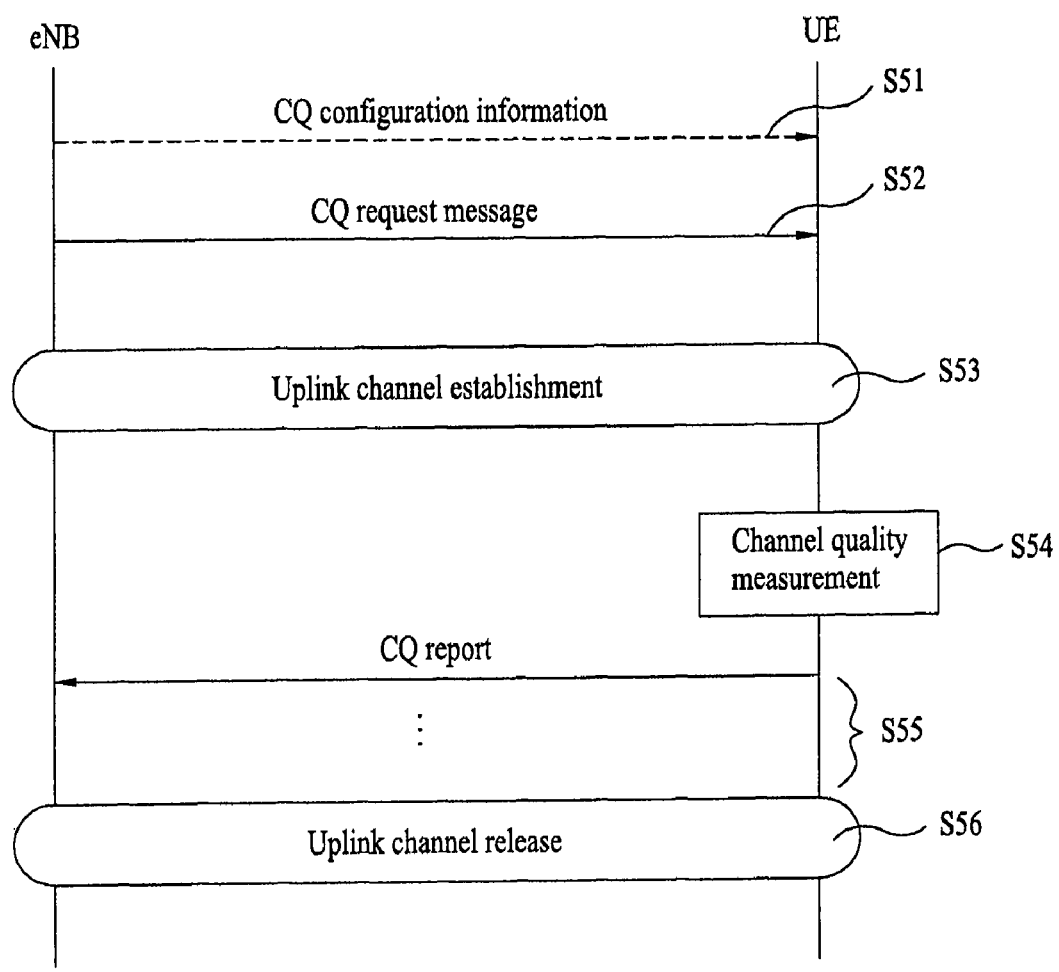
FIG. 5 is a flow chart illustrating a procedure according to one embodiment of the present invention.

FIG. 5 is a flow chart illustrating a procedure according to one embodiment of the present invention. According to the embodiment of FIG. 5, technical features of the present invention are applied to the case where the network provides MBMS to the user equipment. Hereinafter, description will be made only if necessary for understanding of the embodiment according to the present invention, and description of a general procedure required for communication between the network and the user equipment will be omitted.

Referring to FIG. 5, the base station (eNB) transmits configuration information for channel quality reporting to the user equipment [S51]. The configuration information includes information required to allow the user equipment to report channel quality, and includes establishment information of at least one uplink channel for reporting channel quality. In addition, the configuration information includes all or a portion of information related to a transmission period of reporting of the channel quality, the number of repetition (i.e. transmission times) of reporting of the channel quality, a valid duration of the configuration information, and a time interval where the reporting of channel quality will be performed. Meanwhile, the configuration information can further include a type of a measurement procedure, a measurement target, a measurement value, criteria of a measurement report, and a target of the measurement report.

For example, the configuration information can be configured in such a manner that one part of the configuration information for establishment of each uplink channel to report channel quality and the other part of the configuration information corresponding to the corresponding uplink channel, which contains the remaining information for configuration, can be included in one set. In this case, the entire configuration information comprises a plurality of partial configuration information sets corresponding to each uplink channel. An identifier, for example, a channel number of an uplink channel is given to each partial configuration information set. In the embodiment of FIG. 5, the uplink channel for channel quality reporting is a physical uplink control channel (PUCCH). However, an example of the uplink channel is not limited to the PUCCH.

The configuration information can be transmitted to the user equipment by being included in a specific RRC message transmitted through a MBMS control channel (MCCH) to which control information related to MBMS is transmitted. Alternatively, the configuration information may be transmitted to the user equipment by the base station during establishment of a point-to-multipoint radio bearer for MBMS.

The base station transmits a channel quality request message (CQ request message) to the user equipment to request CQ reporting (i.e. CQ measurement reporting) [S52]. The CQ request message includes an identifier of a specific partial configuration information set included in the configuration information, for example, a channel number of the uplink channel. Also, the CQ request message can include at least one of a user equipment identifier for identifying the user equipment and a service identifier for identifying the MBMS received by the user equipment. The CQ request message can be transmitted through a PDCCH (Physical Downlink Control Channel), a DL-SCH (Downlink Shared Channel), a MCH (Multicast Channel), etc. The CQ request message can be transmitted by being included in an access information message transmitted from the base station to count the number of user equipments which receive or desire to receive the MBMS. An example of the user equipment identifier includes C-RNTI (Radio Network Temporary Identity), and an example of the service identifier includes MTCH RNTI or MBMS RNTI.

According to another embodiment, a part or all of the configuration information can be transmitted to the user equipment by being included in the CQ request message. For example, the CQ request message can include entire configuration information and an identifier of a partial configuration information set of the entire configuration information, wherein the partial configuration information set will be used for corresponding channel quality reporting. Alternatively, the configuration information can be transmitted to the user equipment in such a manner that information related to a transmission period of reporting of the channel quality, the number of repetition (i.e. transmission times) of reporting of the channel quality, a valid duration of the configuration information, and a time interval where the reporting of the channel quality will be performed is included in the configuration information in step S51, and information related to a type of a measurement procedure, a measurement target, a measurement value, criteria of a measurement report, and a target of the measurement report is included in the CQ request message. It will be apparent that various modifications can be considered with respect to transmission of the information.

The user equipment which has received the CQ request message establishes an uplink channel for channel quality reporting [S53]. The uplink channel can be established in accordance with uplink channel establishment information included in a corresponding partial configuration information set indicated by the identifier included in the CQ request message.

The user equipment measures channel quality in accordance with measurement information included in the partial configuration information set indicated by the identifier included in the CQ request message [S54]. In other words, the user equipment can measure channel quality in accordance with the type of the measurement procedure, the measurement target, and the measurement value, which are included in the measurement information. As described in the related art, the measurement target could be a downlink channel where a reference signal is transmitted from the base station to the user equipment, and the measurement value could be CINR, Ec/No, RSCP, etc., for example.

The user equipment performs channel quality reporting (CQ reporting) on the established uplink channel with the measurement result of the channel quality [S55]. The user equipment uses the configuration information, which is included in the partial configuration information set indicated by the identifier included in the CQ request message, during the channel quality reporting. In more detail, if the information, which is related to a transmission period (CQ period) of the channel quality reporting, the number of repetition (i.e. transmission times) of channel quality reporting, the valid duration of the configuration information, and the time interval (CQ interval) where the reporting of the channel quality will be performed, is included in the configuration information, the user equipment periodically performs channel quality reporting through the established uplink channel in accordance with the CQ period for the CQ interval within the valid duration of the configuration information. If the number of transmission times of channel quality reporting without the CQ period is included in the configuration information, the user equipment can non-periodically perform channel quality reporting for the CQ interval.

Figure 6:
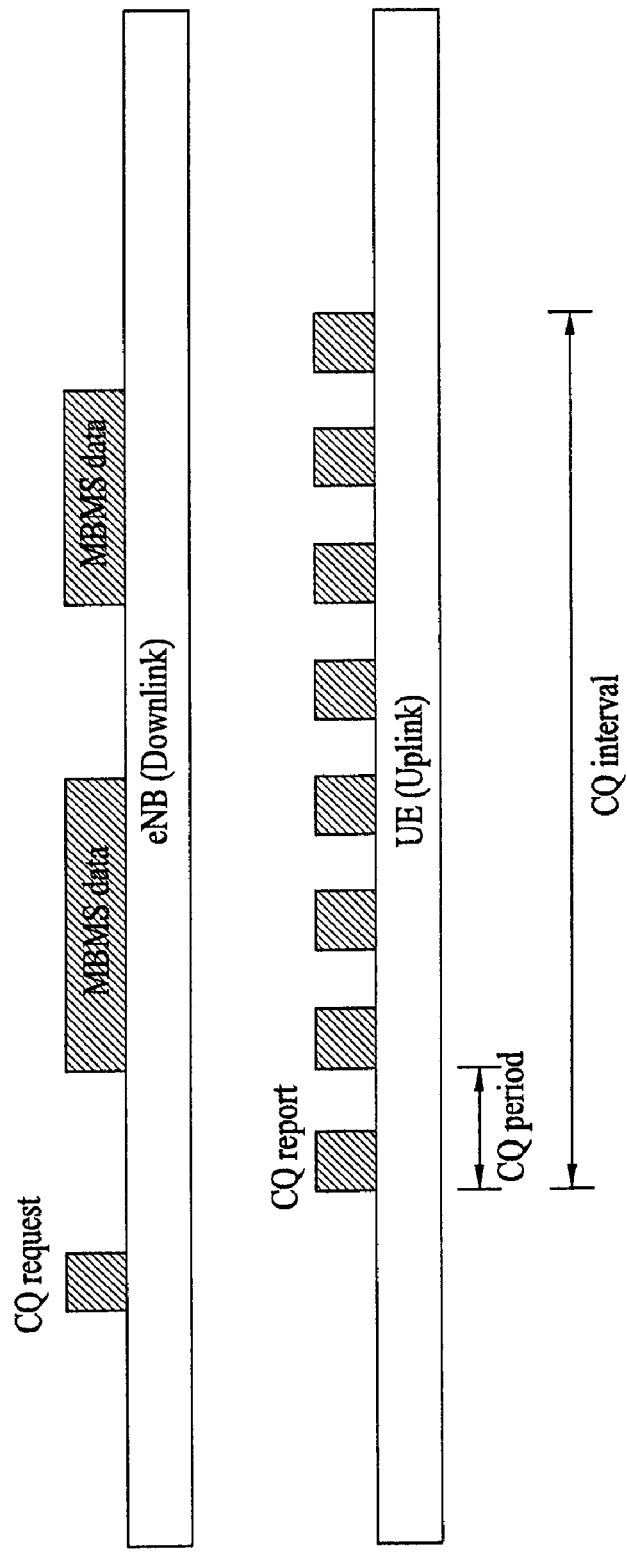
FIG. 6 is a diagram illustrating a channel quality reporting procedure in FIG. 5.

FIG. 6 is a diagram illustrating the channel quality reporting procedure. As illustrated in FIG. 6, the user equipment can report channel quality even for a time interval where MBMS data are received in addition to a time interval where MBMS data are not received.

The user equipment releases the uplink channel after the valid duration of the configuration information passes [S56]. If the user equipment determines that the base station needs channel quality reporting, the user equipment can repeat the steps performed after the step S51 or S52.

Figure 7:
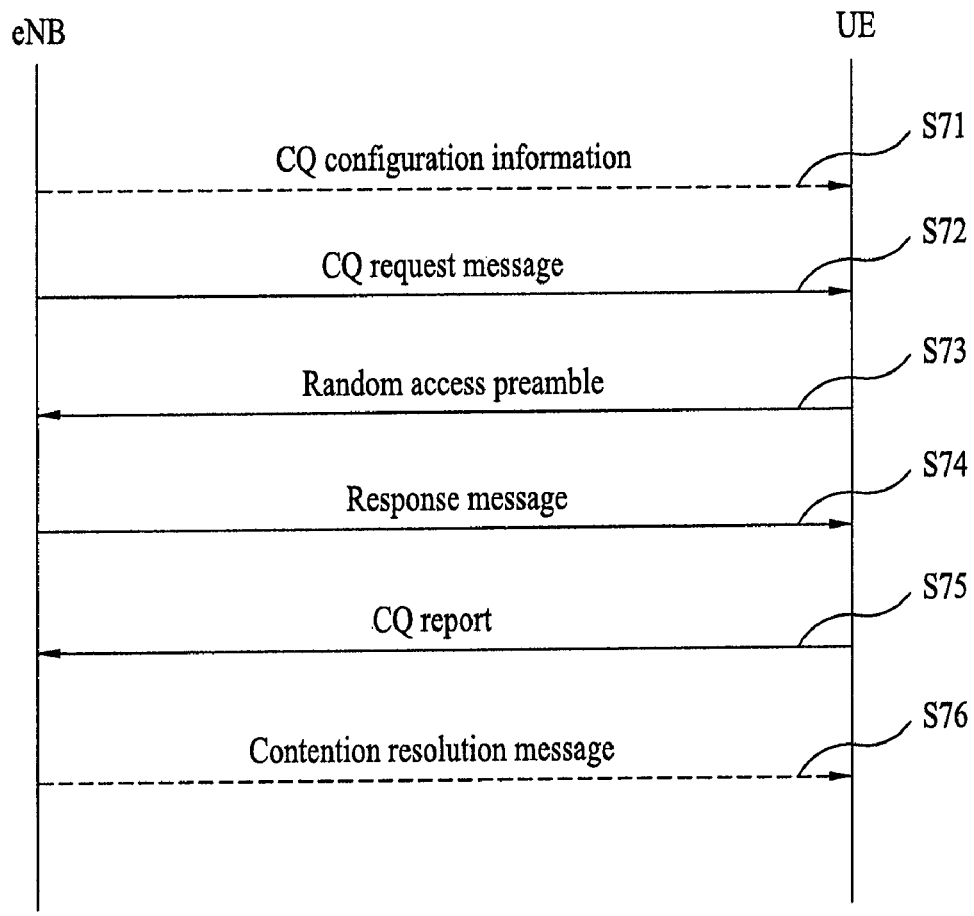
FIG. 7 is a flow chart illustrating a procedure according to another embodiment of the present invention.

FIG. 7 is a flow chart illustrating a procedure according to another embodiment of the present invention. According to the embodiment of FIG. 7, the user equipment, which receives MBMS, reports channel quality through a random access procedure. If the user equipment is not allocated with an uplink channel for channel quality reporting, the user equipment can report channel quality through the random access procedure. Hereinafter, description will be made only if necessary for understanding of the embodiment according to the present invention, and description of a general procedure required for communication between the network and the user equipment will be omitted.

Referring to FIG. 7, the base station (eNB) transmits configuration information (CQ configuration information) related to the random access procedure for channel quality reporting to the user equipment [S71]. The configuration information can include at least one preamble to be used for the random access procedure or information indicating the at least one preamble. Also, the configuration information can further include information related to the number of transmission times of the preamble, a time interval where a response message to the preamble transmitted from the user equipment will be transmitted, and a timer value of a user equipment timer operated while the user equipment is trying to receive a contention resolution message.

The configuration information can be transmitted to the user equipment by being included in an RRC message transmitted through a MBMS control channel (MCCH) to which control information related to the MBMS is transmitted. The RRC message could be a point-to-multipoint radio bearer information message or system information. Alternatively, the configuration information may be transmitted to the user equipment by the base station during establishment of the point-to-multipoint radio bearer for MBMS.

The base station transmits a channel quality request message (CQ request message) to the user equipment, which receives the MBMS, so as to request channel measurement report. The CQ request message includes a user equipment identifier identifying the user equipment and/or a service identifier identifying the MBMS, and a valid time period (duration) of the channel quality request. The CQ request message can be transmitted through the PDCCH, DL SCH, or MCH, etc. The CQ request message can be transmitted by being included in an access information message or scheduling information, wherein the access information message is transmitted by the base station to count the number of user equipments which receive or desire to receive the MBMS, and the scheduling information is related to the access information message.

When transmitting the CQ request message to the user equipment, the base station can allow the access probability to be included in the CQ request message. Namely, the base station allows the success probability of random access to be included in the CQ request message with respect to each user equipment which receives the MBMS, so that a plurality of user equipments which receive the MBMS do not perform the random access procedure for channel quality reporting at the same time. In this case, the user equipment can perform a passing persistency test of random access using the access probability, and can initiate the random access procedure in accordance with the result of the passing persistency test.

According to another embodiment, a part or all of the configuration information can be transmitted to the user equipment by being included in the CQ request message. For example, the configuration information can include at least one preamble to be used for the random access procedure for channel quality reporting or its indication information indicating the at least one preamble.

The user equipment which has received the CQ request message transmits a specific preamble to the base station to initiate the random access procedure if the user equipment identifier and/or the service identifier for the MBMS is included in the CQ request message [S73]. If the at least one preamble or its indication information is included in the configuration information or the CQ request message, the user equipment transmits a preamble selected from the at least one preamble to the base station. If the at least one preamble or its indication information is not included in the configuration information or the CQ request message, the user equipment transmits a preamble selected from a preamble set to the base station, wherein the preamble set is included in the system information which is previously received by the user equipment. Also, if a dedicated preamble for the MBMS is allocated to the user equipment, the user equipment can transmit the dedicated preamble to the base station in step S73.

After receiving the preamble from the user equipment, the base station transmits a response message to the corresponding preamble to the user equipment [S74]. The preamble response message includes a code sequence corresponding to the preamble, radio resource allocation information for channel quality reporting, the user equipment identifier, and/or the service identifier. The response message can include a period of channel quality reporting and duration information of allocated radio resources.

The user equipment which has received the preamble response message performs channel quality reporting (CQ reporting) using the radio resource allocation information [S75]. Namely, if the code sequence corresponding to the transmitted preamble is included in the response message or if the user equipment identifier and/or the service identifier is included in the response message, the user equipment reports channel quality in accordance with the configuration information and the CQ request message using the radio resource allocation information. For example, if the channel quality reporting period and duration are included in the configuration information, the CQ request message or the uplink radio resource allocation information, the user equipment reports the channel quality periodically measured per period using the allocated radio resources for the duration. The channel quality reporting can be transmitted to the base station by being included in the RRC message or in a type of MAC control information.

If the CQ request message is included in the access information message for MBMS counting, the user equipment can transmit the counting response message, which includes a measurement result of the channel quality, to the base station.

If the user equipment fails to receive the at least one preamble through the configuration information or the CQ request message, or if the preamble transmitted in step S73 is not the dedicated preamble, the base station transmits a contention resolution message to the user equipment. If the user equipment receives the contention resolution message, which includes the user equipment identifier and/or the service identifier, the user equipment terminates the random access procedure.

If the user equipment fails to successfully perform the random access procedure for the channel quality reporting or if the base station does not receive the channel quality reporting from the user equipment within a predetermined time period after transmitting the CQ request message, the base station can transmit the CQ request message to the user equipment again. In this case, the aforementioned random access procedure is initiated again.

If the user equipment fails to receive the contention resolution message, which includes the user equipment identifier and/or the service identifier, within a predetermined time period and the duration of the channel quality request is valid, the user equipment can retransmit a preamble to the base station. In this case, the user equipment can reuse the preamble selected in step S73.

The base station can terminate the channel quality reporting procedure by sending a reporting stop command to the user equipment while the user equipment is performing the channel quality reporting procedure according to the aforementioned random access. The reporting stop command can be transmitted to the user equipment on MCCH, MTCH, PDCCH, preamble response message or contention resolution message. If the PDCCH is used, a specific RNTI can be used as information indicating the reporting stop command. If the user equipment receives the reporting stop command, the user equipment terminates the channel quality reporting procedure.

In a state that the user equipment is performing the random access procedure for another purpose other than the purpose of the channel quality reporting, for example, the random access procedure for MBMS counting, if the user equipment receives channel quality request information, the user equipment identifier, and/or the service identifier through the preamble response message, the user equipment can perform the channel quality reporting using uplink channel information included in the response message. At this time, the base station can transmit the contention resolution message, which includes the user equipment identifier and/or the service identifier, to the user equipment.

The aforementioned embodiments are achieved by combination of structural elements and features of the present invention in a predetermined type. Each of the structural elements or features should be considered selectively unless specified separately. Each of the structural elements or features may be carried out without being combined with other structural elements or features. Also, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment. Moreover, it will be apparent that some claims referring to specific claims may be combined with another claims referring to the other claims other than the specific claims to constitute the embodiment or add new claims by means of amendment after the application is filed.

The embodiments of the present invention have been described based on the data transmission and reception between the base station and the user equipment. A specific operation which has been described as being performed by the base station may be performed by an upper node of the base station as the case may be. In other words, it will be apparent that various operations performed for communication with the user equipment in the network which includes a plurality of network nodes along with the base station can be performed by the base station or network nodes other than the base station. The base station may be replaced with terms such as a fixed station, Node B, eNode B (eNB), and access point. Also, the user equipment may be replaced with terms such as mobile station (MS) and mobile subscriber station (MSS).

The embodiments according to the present invention may be implemented by various means, for example, hardware, firmware, software, or their combination. If the embodiment according to the present invention is implemented by hardware, the random access method in the wireless communication system according to the embodiment of the present invention may be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

If the embodiment according to the present invention is implemented by firmware or software, the method of processing data in a wireless communication system according to the embodiment of the present invention may be implemented by a type of a module, a procedure, or a function, which performs functions or operations described as above. A software code may be stored in a memory unit and then may be driven by a processor. The memory unit may be located inside or outside the processor to transmit and receive data to and from the processor through various means which are well known.

It will be apparent to those skilled in the art that the present invention can be embodied in other specific forms without departing from the spirit and essential characteristics of the invention. Thus, the above embodiments are to be considered in all respects as illustrative and not restrictive. The scope of the invention should be determined by reasonable interpretation of the appended claims and all change which comes within the equivalent scope of the invention are included in the scope of the invention.

INDUSTRIAL APPLICABILITY

The present invention can be used in a wireless communication system such as a mobile communication system or a wireless Internet system.

The invention claimed is:

1. A method of reporting channel quality (CQ) in a user equipment receiving a point-to-multipoint service in a wireless communication system, the method comprising:
   receiving configuration information for reporting of channel quality from a network, the configuration information corresponding to each of at least one uplink channel;
   receiving a request message requesting to report the channel quality from the network; and
   reporting the channel quality using configuration information corresponding to an uplink channel among the at least one uplink channel,
   wherein the request message includes an indicator indicating the configuration information corresponding to the uplink channel to be used to report the channel quality.

2. The method of claim 1, wherein the configuration information corresponding to an uplink channel is included in the request message.

3. The method of claim 1, wherein the configuration information corresponding to each of at least one uplink channel is received during establishment of a radio bearer (RB) of the point-to-multipoint service.

4. The method of claim 1, wherein the configuration information corresponding to each of at least one uplink channel includes information associated with at least one of a transmission period of reporting of the channel quality, the number of repetition of reporting of the channel quality, an valid duration of the configuration information corresponding to each of the uplink channel, and a time interval where the reporting of the channel quality will be performed.

5. The method of claim 4, wherein the configuration information corresponding to each of at least one uplink channel further includes allocation information of a corresponding uplink channel.

6. The method of claim 5, wherein the step of reporting of the channel quality comprises:

establishing the uplink channel using the allocation information; and reporting the channel quality in accordance with the configuration information corresponding to the uplink channel on the established uplink channel.

7. The method of claim 4, wherein the configuration information corresponding to each of at least one uplink channel further includes a user equipment (UE) identifier identifying the user equipment and a service identifier identifying the point-to-multipoint service.

* * * * *